(12) United States Patent
Starr

(10) Patent No.: US 6,879,601 B2
(45) Date of Patent: *Apr. 12, 2005

(54) METHOD AND SYSTEM FOR CONVEYING MULTIPLE CALLS ON A SINGLE TELEPHONE LINE

(75) Inventor: Thomas J J Starr, Barrington, IL (US)

(73) Assignee: SBC Properties, L.P., Reno, NV (US)

( * ) Notice: Subject to any disclaimer, the term of this patent is extended or adjusted under 35 U.S.C. 154(b) by 493 days.

This patent is subject to a terminal disclaimer.

(21) Appl. No.: 09/997,033

(22) Filed: Nov. 20, 2001

(65) Prior Publication Data

US 2002/0167970 A1 Nov. 14, 2002

Related U.S. Application Data

(63) Continuation of application No. 09/255,969, filed on Feb. 23, 1999, now Pat. No. 6,324,167.

(51) Int. Cl.⁷ .................................................. H04J 1/00
(52) U.S. Cl. ...................................................... 370/485
(58) Field of Search ................................. 370/463, 480, 370/481, 482, 483, 485, 487, 489, 490, 494, 495; 375/225, 227, 220, 222; 379/93.01, 90.01

(56) References Cited

U.S. PATENT DOCUMENTS

| | | | |
|---|---|---|---|
| 4,908,839 A | 3/1990 | Morimoto et al. | |
| 5,140,630 A | 8/1992 | Fry et al. | |
| 5,297,186 A | 3/1994 | Dong | |
| 5,610,922 A | 3/1997 | Balatoni | |
| 5,668,814 A | 9/1997 | Balatoni | |
| 5,668,857 A | 9/1997 | McHale | |
| 5,802,446 A | 9/1998 | Giorgi et al. | |
| 5,825,777 A | 10/1998 | Komarek et al. | |
| 6,324,167 B1 * | 11/2001 | Starr | 370/250 |
| 6,345,071 B1 * | 2/2002 | Hamdi | 375/222 |
| 6,373,860 B1 * | 4/2002 | O'Toole et al. | 370/493 |
| 6,538,986 B2 * | 3/2003 | Isaksson et al. | 370/207 |
| 6,580,710 B1 * | 6/2003 | Bowen et al. | 370/353 |

* cited by examiner

Primary Examiner—Kwang Bin Yao

(57) ABSTRACT

A system for implementing multiple communication channels on a single twisted pair transmission line is disclosed. The system derives additional communication channels by way of a separate transceiver unit for each derived line. Each transceiver unit communicates in a separate predetermined frequency band. Each transceiver unit, upon connection to the transmission line, automatically utilizes the lowest unoccupied frequency band by monitoring each frequency band for the presence of signal poser. Thus, as many derived lines as will be supported by the customer transmission loop can be readily added.

1 Claim, 1 Drawing Sheet

METHOD AND SYSTEM FOR CONVEYING MULTIPLE CALLS ON A SINGLE TELEPHONE LINE

CROSS-REFERENCE TO RELATED APPLICATIONS

This is a continuation of U.S. patent application Ser. No. 09/255,969 filed on Feb. 23, 1999 now U.S. Pat. No. 6,324,167.

TECHNICAL FIELD

This invention relates in general to data communication across a telephone transmission line and, more particularly, to a method and system for simultaneously conveying multiple data transmissions over a single telephone transmission line.

BACKGROUND OF THE INVENTION

There is an increasing demand on local telephone companies to provide more communication channels at each customer premises. In an individual home, for example, there may be a need for two or more communication channels to carry voice data and one or more channels to support digital communications for such devices as a facsimile machine, a personal computer, or an internet terminal. Various equipment exists today to enable multiple communication signals to be conveyed on a single twisted paired telephone transmission line such as digital added main line (DAML) systems, basic rate integrated services digital network (ISDN) systems, circuit multiplexers, and some implementations of IP telephony wherein voice signals are conveyed via Internet Protocol Packets routed through the Internet. In such existing systems, all of the communication channels are terminated by one transceiver-multiplexer at each end of the telephone transmission line, and all of the communication channels are combined by a common unit and transmitted as one modulated signal.

Recently, twisted pair telephone transmission line connections have been used for communicating two simultaneous channels such as digital data and analog voice signals. Typically, a high speed digital subscriber line (DSL) channel such as ADSL and a plain old telephone system (POTS) channel are established over a single twisted pair wire connection. A POTS splitter is typically utilized to decouple the channels into separate frequency bands. The POTS channel usually resides in a frequency spectrum of about 0 kHz to about 4 kHz, and the ADSL channel resides in a frequency spectrum of about 20 kHz to about 500 kHz. A low pass filter is often included in such a system to isolate the channels and minimize high frequency transients produced by on-hook/off-hook transitions which can degrade the high speed data transmission on the ADSL channel.

FIGS. 1A and 1B show one implementation of a DAML system just described. In FIG. 1A, the customer premises 10 is connected to the public switched telephone network 12 through the twisted pair transmission line 14 connected into the main distribution frame 16. DAML unit 20 is connected to the network interface device 18 through wall jack 19. The DAML unit 20 supports two independent communication channels 22, 24 by multiplexing the signals and transmitting them across transmission line 14 as a single modulated signal. Phone 1 communicates on baseband POTS. A low pass filter (LPF) 21 isolates the higher frequency transients and interference between the two communication channels. A corresponding DAML unit 13 and LPF 15 are connected on the network side of the system. FIG. 1B represents the frequency band of the signal transmitted across transmission line 14. Phone 1 communication is baseband POTS 23 and phones 2 and 3 communicate in a combined, higher frequency channel 25. Most DAML systems currently omit the baseband POTS channel.

Traditional DAML systems are designed to work on nearly all customer transmission loops. Since transmission signal quality is related to the customer distance from the central office, the number of communication channels a DAML system can support is limited by the worst-case scenario transmission loop in the overall system. In other words, the DAML system must be able to support the same number of additional communication lines for customers furthest from the central office as it does for customers nearest to the central office. Accordingly, the upper frequency range supported by the DAML units is artificially limited for customers whose transmission loops would support higher frequency ranges and, therefore, additional communication channels.

The present invention overcomes this drawback by deriving additional communication channels wherein each additional communications channel is modulated into a separate signal in a separate frequency band by way of a separate transceiver unit such as a DAML. For each additional communications channel desired, a separate transceiver unit is connected to the telephone transmission line at the customer premises in, for example, a wall jack. Each transceiver unit automatically utilizes the lowest unoccupied frequency band by monitoring each frequency band for the presence of signal power. This configuration enables transmission lines of customers closer to the central office to support several derived communications channels, whereas transmission lines for customers further from the central office with less usable bandwidth could still be used to support a fewer number of derived communications channels.

BRIEF DESCRIPTION OF THE DRAWINGS

For a more complete understanding of the invention, reference should now be had to the embodiments illustrated in greater detail in the accompanying drawings and described below by way of examples of the invention. In the drawings.

DETAILED DESCRIPTION OF THE PREFERRED EMBODIMENT(S)

Figure 1A:
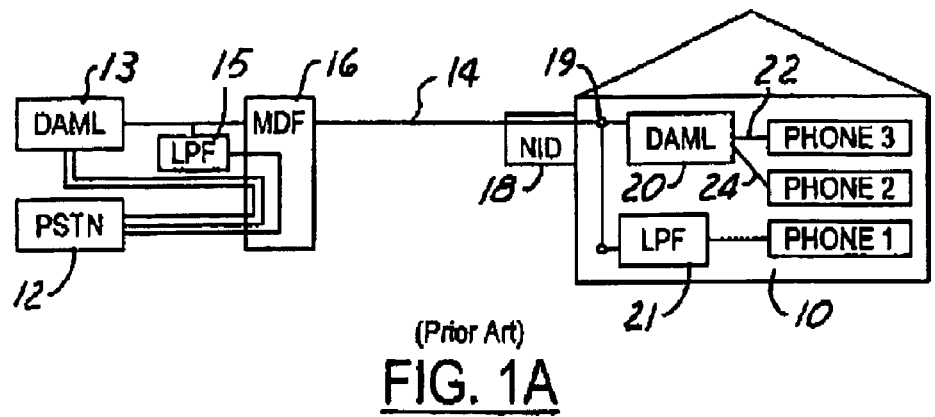
FIG. 1A is a schematic diagram of prior art DAML implementation.
Figure 2A:
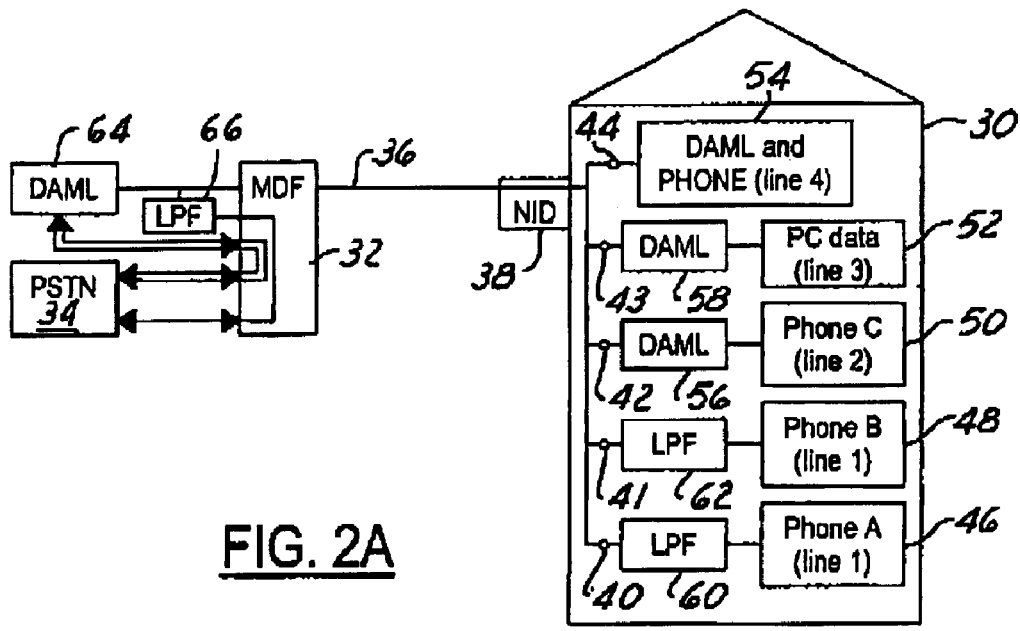
FIG. 2A is a schematic diagram of one embodiment of the present invention for adding additional communications channels to a single telephone line.
Figure 1B:
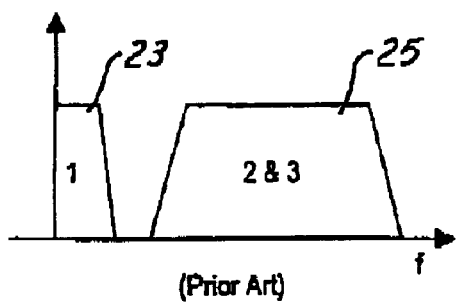
FIG. 1B is a graph of the frequency bands associated with the DAML implementation of FIG. 1A.
Figure 2B:
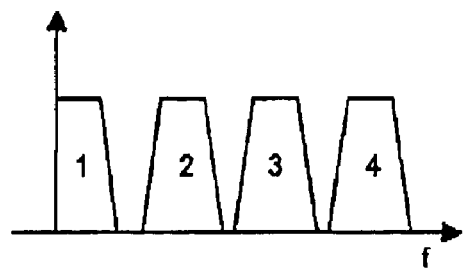
FIG. 2B is a graph of the frequency bands associated with the embodiment illustrated in FIG. 2A.

Referring to FIG. 2A, there is shown a schematic block diagram of one configuration of the present invention for adding additional communication channels to a single twisted pair telephone transmission line. In FIG. 2A, the customer premises 30 is connected to the main distribution frame 32 of the public switched telephone network 34 by twisted pair transmission line 36. The transmission line 36 is physically connected to the customer premises 30 at the network interface device 38. The transmission line 36 terminates at various locations within the customer premises 30 at a series 0 Hz to approximately 4 kHz. Derived lines 2, 3, and 4 use digital modulation transmission, wherein the signals for lines 2, 3, and 4 are modulated into distinct frequency bands which are represented in FIG. 2B. Phones A and B 46, 48, represent extensions on the same line, thus their signals are superimposed into the same channel 1. Also, phones A and B 46, 48, are powered from the central office via transmission line 36, whereas the transmission units for the derived lines 2, 3, and 4 are typically powered from a power source at the customer premises 30 such as commercial AC power.

Because physically separate transceiver units are used to derive each additional communications channel, derived lines can be easily placed in separate rooms within the customer premises 30, and additional derived lines can be readily added. This also allows the same type of transceiver equipment to be used regardless of the number of derived lines. These derived lines, or communications channels, can be used for voice, facsimile, or data transmissions such as, for example, PC access to the Internet. The number of derived lines can be one or more, and a single transceiver unit may derive more than one line.

The transceiver units used to derive additional communications channels are preferably implemented using ADSL-lite (as described in ITU Recommendation G.992.2) or splitterless ADSL bands above the POTS channel (line 1). These frequency bands are predefined at the time of the unit's manufacture. For example, frequency band 2 could be defined as 40–60 kHz, frequency band 3 could be defined as 70–90 kHz, frequency band 4 could be defined as 100–120 kHz, etc. These frequency bands would correspond to the frequency bands represented in the graph of FIG. 23 for lines 2, 3 and 4.

Upon connection to the wall jack 42, DAML unit 56 observes the signal energy in each of the defined frequency bands starting with the lowest. The DAML unit 56 utilizes the lowest frequency band for which the observed signal power is less than a threshold value which represents the minimal expected signal power observed for a frequency band in use by another unit. In this example, DAML unit 56 would likely transmit signals in frequency band 2 since no additional DAML units are connected to the transmission line 36 at this time. Phone C would then communicate over line 2 through DAML unit 56.

To derive additional communication channels (lines 3 and 4), additional DAML units 54 and 58, are connected to the transmission line 36 through wall jacks 44 and 43, respectively. DAML unit 54 is shown as an integrated telephone and DAML unit. Such a unit could have a reduced cost and simplify the installation processor by reducing the number of components to interconnect. In addition, line 3, as shown in FIG. 2A is used to support PC data transmission. Of course, phone C 50, PC 52 and integrated telephone unit 54 are merely illustrative of digital communications devices and could be substituted for any such device. Additional derived lines can be added in a similar manner so long as the usable bandwidth on the customer transmission loop supports such lines. Hence, customers located closer to the telephone company's central office would likely be able to support more derived communication lines than customers located further from the central office because increased distance typically reduces the usable bandwidth of a customer transmission loop.

Upon connection, each DAML unit observes the signal energy in each of the defined frequency bands. The signal energy in each of the frequency bands is monitored by the use of a fast Fourier transform algorithm implemented in firmware on a digital signal process (DSP) integrated circuit located within each DAML unit. The signal power within each predefined frequency band is integrated across the frequency band and averaged over time. The DAML unit utilizes the lowest frequency band for which the observed signal power is less than a threshold value that represents the minimum expected signal power observed for a frequency band in use by another unit. To minimize the probability of contention in the event that several DAML units on a line attempt to start up simultaneously, each DAML unit preferably monitors the signal energy in a frequency band for a bounded random duration of time. Once the DAML unit has found a frequency band with no apparent signal power, it transmits its signal in that frequency band by use of a pass band modulation method. For example, quadrature amplitude modulation (QAM) with a carrier placed at the center of the chosen frequency band. To reduce interference between frequency bands, filtering is implemented by way of the DSP. Interference can be further reduced by placing an empty guard band between each of the defined frequency bands.

As an alternative embodiment, each customer line can be oversubscribed. In other words, the number of communication channels can exceed the number of available frequency bands provided that only as many transceiver units as there are frequency bands are transmitting or off-hook at any given time. In addition, in the event that a DAML unit determined that its signal transmission quality as measured by the signal-to-noise ratio or bit error rate was unacceptable, the DAML unit would stop transmission and search for another acceptable frequency band.

With regard to the transceiver units, if higher data rates or multiple derived phone lines are required of a single transceiver unit, multiple frequency bands, preferably adjacent, would be utilized. Thus, applications such as video can be supported by combining frequency channels.

In another embodiment, one telephone transmission line can be used to support more than one customer premises. In this scenario, the single twisted pair telephone transmission line is connected to multiple customer sites wherein transceiver units such as those described with reference to FIG. 2A are used at each customer site to create communications channels in separate distinct frequency bands. In such a case, however, it is important that only one customer site use the base band POTS frequency channel connected through a low pass filter, otherwise a "party line" would result.

In still another embodiment, the transceiver unit 64 at the central office could be divided into separate transceiver units for each derived line.

While the invention has been described in connection with one or more embodiments, it is to be understood that the invention is not limited to these embodiments. On the contrary, the invention covers all alternatives, modifications, and equivalents as may be included within the scope and spirit of the appended claims.

What is claimed is:

1. A method of implementing a plurality of communication channels on a single twisted pair telephone connection, said method comprising the steps of:

interfacing a first communication device with said telephone connection, said first communication device configured to communicate with said telephone connection on a first communication channel, said first communication channel occupying the lowest available freqency band from a plurality of predetermined frequency bands;

interfacing a second communication device with said telephone connection, said second communication device configured to communicate with said telephone connection on a second communication channel, said second communication channel occupying the lowest available frequency band from said plurality of predetermined frequency bands that is unoccupied by said first communication channel; and interfacing a third communication device with said telephone connection, said third communication device configured to communicate with said telephone connection on a third communication channel, said third communication channel occupying the lowest available frequency band from said plurality of predetermined frequency bands that is unoccupied by said first communication channel and said second communication channel;

whereby said first, second, and third communication channels occupy separate predetermined frequency bands.

* * * * *